United States Patent
Seidel et al.

(10) Patent No.: US 10,956,760 B2
(45) Date of Patent: Mar. 23, 2021

(54) APPARATUS, SERVER AND METHOD FOR VEHICLE SHARING

(71) Applicant: Bayerische Motoren Werke Aktiengesellschaft, Munich (DE)

(72) Inventors: Markus Seidel, Munich (DE); Biyun Zhou, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/745,464

(22) Filed: Jan. 17, 2020

(65) Prior Publication Data

US 2020/0151473 A1    May 14, 2020

Related U.S. Application Data

(63) Continuation of application No. PCT/CN2017/093533, filed on Jul. 19, 2017.

(51) Int. Cl.
*B60R 11/04* (2006.01)
*G06K 9/00* (2006.01)
(Continued)

(52) U.S. Cl.
CPC .......... *G06K 9/00832* (2013.01); *B60R 11/04* (2013.01); *G06Q 10/20* (2013.01);
(Continued)

(58) Field of Classification Search
CPC . H04N 7/181; G06T 7/74; G06T 2207/30268; B60R 11/04;
(Continued)

(56) References Cited

U.S. PATENT DOCUMENTS 4,978,984 A * 12/1990 Brookfield ............. F16M 11/18
                                                            348/148
9,834,154 B2 * 12/2017 Carson .................... B60R 11/04
(Continued)

FOREIGN PATENT DOCUMENTS

CN        101917469 A     12/2010
CN        106682970 A      5/2017
(Continued)

OTHER PUBLICATIONS

International Search Report (PCT/ISA/210) issued in PCT Application No. PCT/CN2017/093533 dated Apr. 12, 2018 (two (2) pages).

(Continued)

*Primary Examiner* — Michael Lee
(74) *Attorney, Agent, or Firm* — Crowell & Moring LLP

(57) ABSTRACT

A server for vehicle sharing includes a receiver receiving a first or second trigger command in relation with renting of the vehicle; a controller generating an activation command based on the first trigger command and generating a hiding command based on the second trigger command, wherein the activation command can cause the vehicle to activate an image capturing component arranged inside the vehicle so as to obtain one or more images of the vehicle interior, and the hiding command can cause the vehicle to hide the image capturing component from view of a user inside the vehicle; and a transmitter transmitting the activation command or the hiding command to the vehicle. The receiver can receive the images of the vehicle interior from the vehicle.

18 Claims, 8 Drawing Sheets

(51) Int. Cl.
*G06T 7/73* (2017.01)
*G06Q 10/00* (2012.01)
*G06Q 30/06* (2012.01)
*B60R 11/00* (2006.01)

(52) U.S. Cl.
CPC .......... *G06Q 30/0645* (2013.01); *G06T 7/74* (2017.01); *B60R 2011/0028* (2013.01); *B60R 2300/303* (2013.01); *G06T 2207/30268* (2013.01)

(58) Field of Classification Search
CPC ...... B60R 2011/0028; B60R 2300/303; G06Q 10/20; G06Q 30/0645
USPC ......................................................... 348/148
See application file for complete search history.

(56) References Cited

U.S. PATENT DOCUMENTS

| | | | | |
|---|---|---|---|---|
| 2004/0233282 | A1* | 11/2004 | Stavely | G08B 13/19669 348/143 |
| 2010/0085171 | A1* | 4/2010 | Do | G08B 25/08 340/426.1 |
| 2014/0327773 | A1* | 11/2014 | Scott-Cook | G08B 13/19665 348/148 |
| 2014/0375807 | A1* | 12/2014 | Muetzel | H04N 7/18 348/148 |
| 2015/0019613 | A1* | 1/2015 | Amano | H04W 52/0229 709/201 |
| 2015/0169968 | A1* | 6/2015 | Michmerhuizen | B60R 1/00 348/148 |
| 2015/0286881 | A1* | 10/2015 | Chen | G06Q 30/0645 348/77 |
| 2015/0370253 | A1* | 12/2015 | Gurin | H04N 7/185 701/23 |
| 2017/0301201 | A1* | 10/2017 | Siann | H04N 5/232411 |
| 2018/0020346 | A1* | 1/2018 | Li | H04L 12/2809 |
| 2018/0139485 | A1* | 5/2018 | Ansari | H04N 21/2743 |
| 2018/0362296 | A1* | 12/2018 | Friedli | B66B 1/30 |
| 2019/0351869 | A1* | 11/2019 | Eberlein | B60R 25/302 |

FOREIGN PATENT DOCUMENTS

| | | |
|---|---|---|
| CN | 106910292 A | 6/2017 |
| CN | 107491765 A | 12/2017 |
| JP | 2010-146229 A | 7/2010 |

OTHER PUBLICATIONS

Written Opinion (PCT/ISA/237) issued in PCT Application No. PCT/CN2017/093533 dated Apr. 12, 2018 (three (3) pages).

\* cited by examiner

702

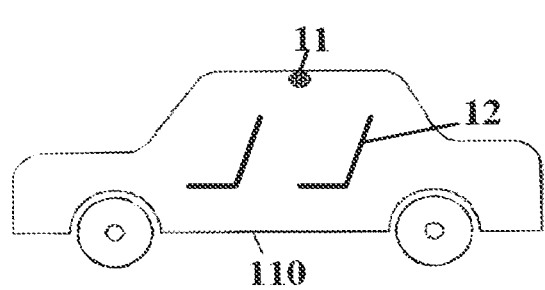
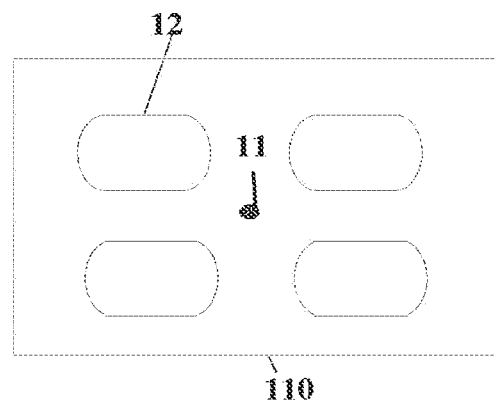
FIG. 10A  FIG. 10B
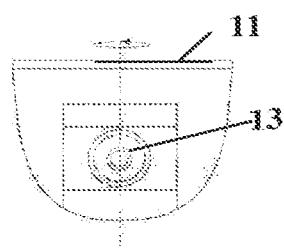
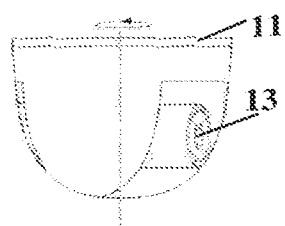
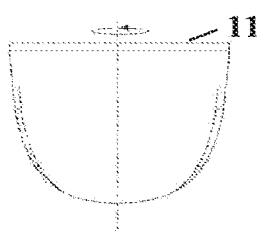
FIG. 11A  FIG. 11B  FIG. 11C

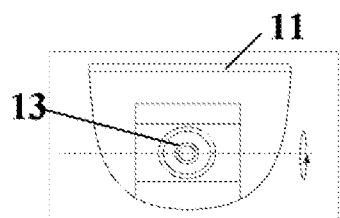
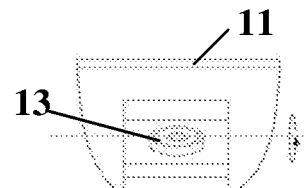
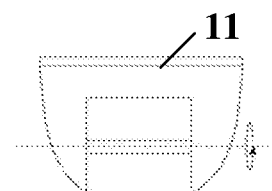
FIG. 12A     FIG. 12B     FIG. 12C
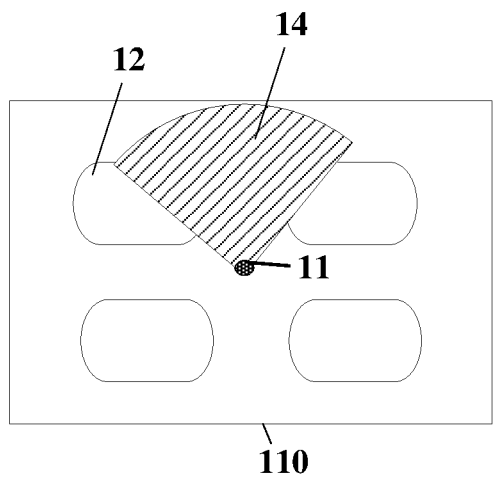
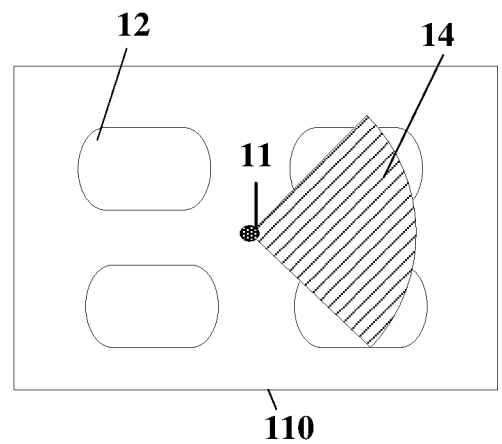
FIG. 13A     FIG. 13B
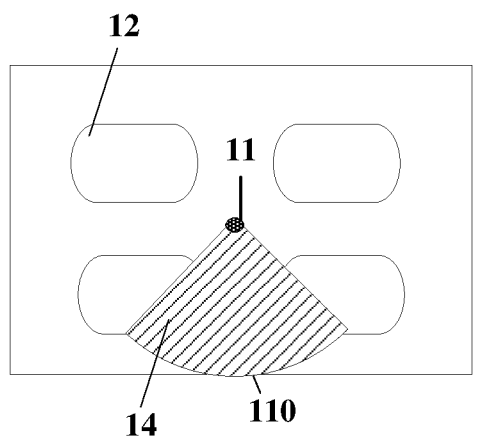
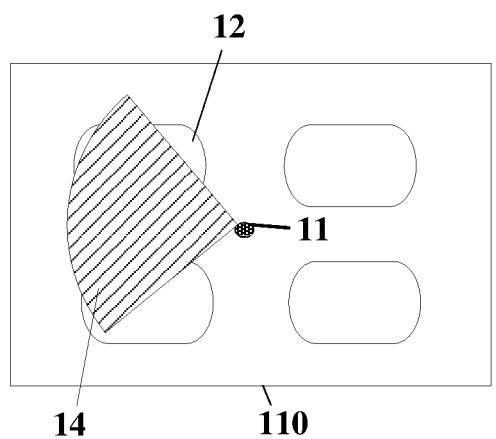
FIG. 13C     FIG. 13D

APPARATUS, SERVER AND METHOD FOR VEHICLE SHARING

CROSS REFERENCE TO RELATED APPLICATION

This application is a continuation of PCT International Application No. PCT/CN2017/093533, filed Jul. 19, 2017, the entire disclosure of which is herein expressly incorporated by reference.

BACKGROUND AND SUMMARY OF THE INVENTION

The present invention generally relates to the field of vehicle sharing, and more particularly, relates to an apparatus, server and method for vehicle sharing which can detect interior condition of a vehicle.

Several vehicle sharing service platforms are developing and available in these years. The current vehicle sharing service is not convenient for the user and the operator of the platform, especially in the aspect of checking the interior condition of the vehicle.

The present invention aims to provide an improved apparatus, server and method for vehicle sharing.

In accordance with a first exemplary embodiment of the present disclosure, a server for vehicle sharing is provided, comprising: a receiver configured to receive a first trigger command or a second trigger command in relation with renting of the vehicle; a controller configured to generate an activation command based on the first trigger command and generate a hiding command based on the second trigger command, wherein the activation command is adapted to cause the vehicle to activate an image capturing component arranged inside the vehicle so as to obtain one or more images of the vehicle interior, and the hiding command is adapted to cause the vehicle to hide the image capturing component from view of a user inside the vehicle; and a transmitter configured to transmit the activation command or the hiding command to the vehicle; wherein the receiver is further configured to receive the one or more images of the vehicle interior from the vehicle.

In an example of the present embodiment, the first trigger command is a selection command indicating that the user selects the vehicle, a placing-order command indicating that the user places an order for renting the vehicle, or a return command indicating the user returns the vehicle, wherein, the second trigger command is a pick-up command indicating that the user picks up the vehicle, or a detection signal indicating that the user sits inside the vehicle.

In an example of the present embodiment, in the case of receiving more than one images of the vehicle interior from the vehicle, the controller is further configured to combine the more than one images into one image showing the entire interior of the vehicle.

In an example of the present embodiment, in the case that the first trigger command is the selection command indicating that the user selects the vehicle before placing an order for renting the vehicle, the transmitter is further configured to send the one or more images of the vehicle interior to the user's terminal, in order for the user to preview the vehicle interior before placing the order.

In an example of the present embodiment, the controller is further configured to generate a tutorial for guiding the user to manipulate the vehicle, based on the received one or more images of the vehicle interior.

In an example of the present embodiment, when the user selects the vehicle or places the order for renting the vehicle, the first trigger command is the selection command or the placing-order command, and the receiver receives the one or more images of the vehicle interior as a first set of images; when the user returns the vehicle, the first trigger command is the return command, and the receiver receives the one or more images of the vehicle interior as a second set of images; and the controller is further configured to compare the second set of images with the first set of images so as to evaluate the usage condition for this renting order.

In accordance with a second exemplary embodiment of the present disclosure, an on-vehicle apparatus for vehicle sharing is provided, comprising: an image capturing component; a receiver configured to receive an activation command or a hiding command; a controller configured to activate the image capturing component so as to obtain one or more images of the vehicle interior in response to the activation command, and to hide the image capturing component from view of a user inside the vehicle in response to the hiding command; and a transmitter configured to transmit the one or more images of the vehicle interior to the server.

In an example of the present embodiment, the image capturing component is arranged at the middle top of the vehicle, and the image capturing component has at least 90° field of view.

In an example of the present embodiment, the image capturing component is able to rotate around at least one of a horizontal axis and a vertical axis.

In an example of the present embodiment, when the user places an order for renting the vehicle, or selects the vehicle before or after placing the order, the receiver receives the activation command so that the image capturing component captures one or more images of the vehicle interior; and when the user picks up the vehicle or it is detected that the user sits inside the vehicle, the receiver receives the hiding command so that the image capturing component is hidden from view of the user inside the vehicle.

In accordance with a third exemplary embodiment of the present disclosure, a computer-implemented method for vehicle sharing is provided, comprising: acquiring a first trigger command or a second trigger command received by a server; and generating an activation command based on the first trigger command, and generating a hiding command based on the second trigger command, wherein the first and second trigger commands are in relation with renting of the vehicle, wherein the activation command is adapted to cause the vehicle to activate an image capturing component arranged inside the vehicle so as to obtain one or more images of the vehicle interior, and wherein the hiding command is adapted to cause the vehicle to hide the image capturing component from view of a user inside the vehicle.

In an example of the present embodiment, the first trigger command is a selection command indicating that the user selects the vehicle, a placing-order command indicating that the user places an order for renting the vehicle, or a return command indicating the user returns the vehicle, wherein, the second trigger command is a pick-up command indicating that the user picks up the vehicle, or a detection signal indicating that the user sits inside the vehicle.

In an example of the present embodiment, the method further comprises combining the more than one images into one image showing the entire interior of the vehicle, in the case of obtaining more than one images of the vehicle interior.

In an example of the present embodiment, the method further comprises causing the one or more images of the vehicle interior to be sent to the user's terminal, in order for the user to preview the vehicle interior before placing the order, in the case that the first trigger command is the selection command indicating that the user selects the vehicle before placing an order for renting the vehicle.

In an example of the present embodiment, the method further comprises generating a tutorial for guiding the user to manipulate the vehicle, based on the one or more images of the vehicle interior.

In an example of the present embodiment, the method further comprises: storing the one or more images of the vehicle interior as a first set of images, when the user selects the vehicle or places the order for renting the vehicle, and the first trigger command is the selection command or the placing-order command, storing the one or more images of the vehicle interior as a second set of images, when the user returns the vehicle, and the first trigger command is the return command, and comparing the second set of images with the first set of images so as to evaluate the usage condition for this renting order.

In accordance with a fourth exemplary embodiment of the present disclosure, a computer-implemented method for vehicle sharing is provided, comprising: acquiring an activation command or a hiding command; activating an image capturing component arranged inside the vehicle so as to obtain one or more images of the vehicle interior, in response to the activation command, and hiding the image capturing component from view of a user inside the vehicle, in response to the hiding command.

In an example of the present embodiment, when the user places an order for renting the vehicle, or selects the vehicle before or after placing the order, the activation command is acquired, so that the image capturing component is activated so as to obtain the one or more images of the vehicle interior; and when the user picks up the vehicle or it is detected that the user sits inside the vehicle, the hiding command is acquired, so that the image capturing component is hidden from view of the user inside the vehicle.

In accordance with a fifth exemplary embodiment of the present disclosure, an apparatus for vehicle sharing is provided, comprising: one or more processors; and one or more memories configured to store a series of computer executable instructions, wherein the series of computer executable instructions, when executed by the one or more processors, cause the one or more processors to perform any one of the above mentioned methods.

In accordance with a sixth exemplary embodiment of the present disclosure, a non-transitory computer readable storage medium is provided, the medium having instructions stored thereon that, when executed by one or more processors, cause the one or more processors to perform any one of the above mentioned methods.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from the following detailed description.

BRIEF DESCRIPTION OF THE DRAWINGS

The accompanying drawings, which are incorporated in and constitute a part of the specification, illustrate, by way of example, embodiments of the invention and, together with the description, serve to explain the principles of the invention. Throughout the drawings, similar reference numerals are used for denoting similar items. Note that the drawings are not necessarily drawn to scale.

FIGS. 10A-10B show a preferred position of the image capturing component (such as camera etc.) inside the vehicle, wherein FIG. 10A illustrates a side view of the vehicle containing the image capturing component, and FIG. 10B illustrates a top view of the vehicle containing the image capturing component, in accordance with an exemplary embodiment of the present disclosure.

FIGS. 11A-11C illustratively shows three front views of different states of the image capturing component while it rotates around the vertical axis, in accordance with an exemplary embodiment of the present disclosure.

FIGS. 12A-12C illustratively shows three front views of different states of the image capturing component while its lens rotates around the horizontal axis for the purpose of hiding from view, in accordance with an exemplary embodiment of the present disclosure.

FIGS. 13A-13D illustratively shows four top views of the vehicle containing the image capturing component, while the image capturing component rotates around the vertical axis for 360° view of the vehicle interior, in accordance with an exemplary embodiment of the present disclosure.

DETAILED DESCRIPTION OF THE DRAWINGS

Figure 1:
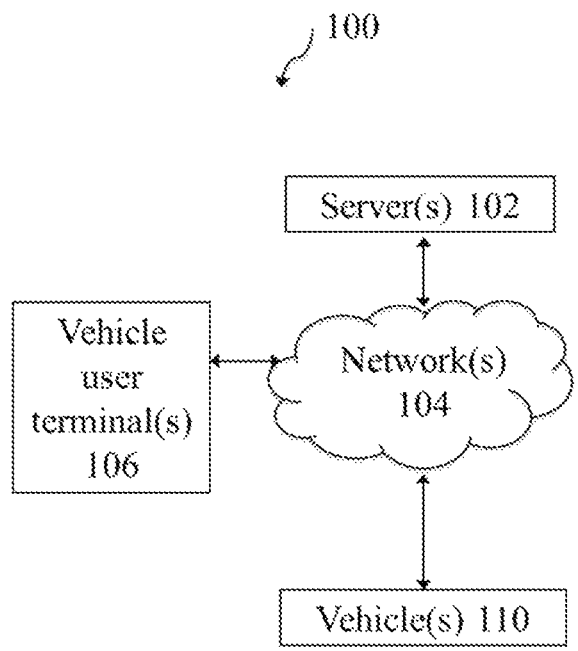
FIG. 1 illustrates an exemplary block diagram of a system for vehicle sharing service in accordance with an exemplary embodiment of the present disclosure.

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

In the present disclosure, the terms "first", "second" and the like are only used to discriminate between elements or steps, but are not intended to indicate a temporal order, a preference or an importance.

It is to be noted that the term "vehicle" (also referred to as "driving equipment" hereinafter) used through the specification refers to such a vehicle in which one or more sensors (such as imaging sensors or other detecting sensors) may be provided (be mounted or be disposed) so that the vehicle interior may be viewed through the images taken by the imaging sensors. For example, such a vehicle comprises, but is not limited to, a car, a truck, a bus, an airplane, a ship, or the like. The term "server" may be any machine configured to perform processing and/or calculations, may be but is not limited to a work station, a desktop computer, a laptop computer, a tablet computer, a personal data assistant, a smart phone or any combination thereof. It should further be understood that components of server may be distributed across a network. For example, some processing may be performed using one processor while other processing may be performed by other processor(s) remote from the one processor. Other components of the server may also be similarly distributed. As such, the server may be interpreted as a distributed computing system that performs processing in multiple locations.

Next, embodiments of the present invention will be described in detail below with reference to the drawings. Here, please note that similar reference numerals are used to indicate similar components, and detailed description thereof will be omitted for conciseness.

Referring first to FIG. 1, there is shown an exemplary block diagram of a system 100 for vehicle sharing service according to an exemplary embodiment of the present disclosure. The system 100 comprises server(s) 102, vehicle user terminal(s) 106, and vehicle(s) 110 connected and communicated with each other through network(s) 104, as shown in FIG. 1.

The server(s) 102 may function as a vehicle sharing service platform, for assisting the operator of the platform in renting the vehicle 110 to a user via e.g. the user terminal 106 connected with the server(s) 102. The server(s) 102 may also help the operator of the platform monitoring the vehicle 110 used for rental service, e.g., the interior condition of the vehicle. The network(s) 104 may transmit data or information with respect to the vehicle, the user and the operator, among the server(s) 102, the vehicle user terminal(s) 106, the vehicle(s) 110 and optionally an operator terminal (not shown). Optionally, the operator may use the operator terminal (such as a smart phone, a tablet, a personal digital assistant, a desktop computer, a laptop computer or the like) to monitor and manage the vehicle rental service of the platform. In a specific example, the server(s) 102 may receive data from the vehicle and the vehicle user terminal, process the received data and output the processed data. The network(s) 104 may be but is not limited to a local area network (LAN), a wide area network (WAN) or a worldwide network such as Internet. The vehicle user terminal 106 may be but is not limited to a smart phone, a tablet, a personal digital assistant, a desktop computer, a laptop computer or any other application or apparatus capable of receiving, displaying and outputting data and information.

Figure 2:
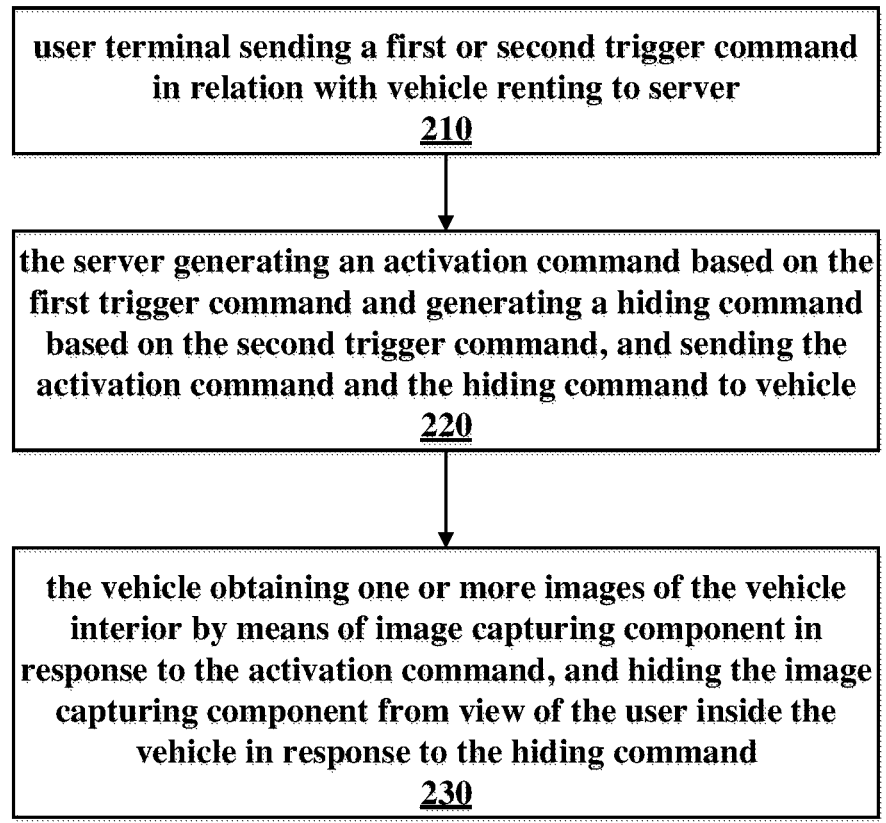
FIG. 2 illustrates a flow chart showing an exemplary process for vehicle sharing service in accordance with an exemplary embodiment of the present disclosure.

FIG. 2 illustrates a flow chart showing an exemplary process for vehicle sharing service in accordance with an exemplary embodiment of the present disclosure. At operation 210, the user terminal 106 sends a first or second trigger command in relation with renting vehicle 110, to the server 102. Then, at operation 220, the server 102 generates an activation command based on the first trigger command and generates a hiding command based on the second trigger command. Then, the server 102 sends the activation command and the hiding command to the vehicle 110. At operation 230, the vehicle 110 obtains one or more images of the vehicle interior by means of an image capturing component inside the vehicle in response to the activation command, and hides the image capturing component from view of the user inside the vehicle in response to the hiding command.

Figure 3:
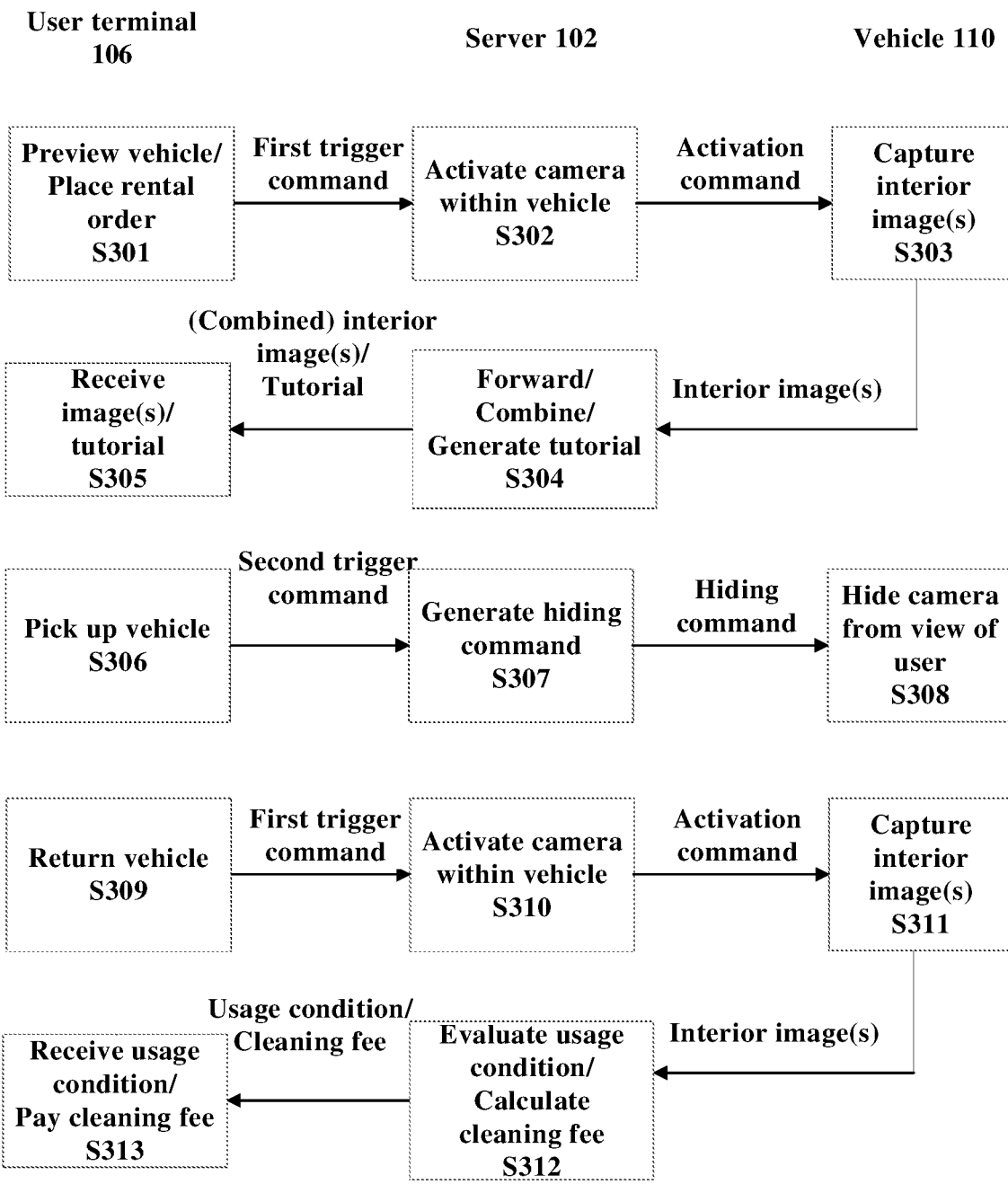
FIG. 3 illustrates a detailed example for the process of FIG. 2.

A detailed example for the process of FIG. 2 is shown in FIG. 3. Please note that, this example of FIG. 3 is merely exemplary, and not intended to limit the scope of the present invention. FIG. 3 illustrates a substantially overall flowchart for a vehicle rental service.

When the user wants to rent a vehicle from the vehicle sharing service platform, he/she may connect the user terminal 106, e.g., his/her smart phone, to the server 102. In some cases, the user may be quite critical about the interior condition of the vehicle and want a clean vehicle. Thus, in step S301, the user may select a vehicle and want to preview its interior before placing a rental order. In some other cases, the user may be not familiar with the model of the vehicle to be rented. Thus, in step S301, when the user places the rental order for the vehicle 110, the user may want to observe the vehicle interior so as to be familiar with the operations of the vehicle 110 in advance. That is to say, in step S301, the user may select to preview vehicle interior or place the rental order via the user terminal 106, and then the user terminal 106 sends a first trigger command to the server 102. The first trigger command may be a selection command indicating that the user selects the vehicle, or a placing-order command indicating that the user places an order for renting the vehicle.

In step S302, the server 102 receives the first trigger command, and generates an activation command based on the first trigger command, wherein the activation command is adapted to cause the vehicle 110 to activate an image capturing component (such as a camera) arranged inside the vehicle so as to obtain one or more images of the vehicle interior. Then the server 102 sends the activation command to the vehicle 110.

In step S303, the vehicle 110 receives the activation command and accordingly activates the image capturing component so as to obtain one or more images of the vehicle interior. Then, the vehicle 110 transmits the one or more images of the vehicle interior to the server 102. The vehicle 110 may generate only one image for the interior of the vehicle, or may generate more than one images.

In step S304, the server 102 receives the one or more images of the vehicle interior. The server 102 may directly forward the received images to the user terminal 106, or may combine the more than one images into one image showing the entire interior of the vehicle and then send the combined image to the user terminal 106. In other cases, when the user is not familiar with the model of the vehicle to be rented, the server 102 may generate a tutorial for guiding the user to manipulate the vehicle, based on the received one or more images of the vehicle interior.

In step S305, the user terminal 106 receives the forwarded interior image(s)/the combined interior image/the generated tutorial. Thus, the user can preview the vehicle interior when choosing the vehicle he/she likes before placing the order. For example, the user can check whether the vehicle is clean or will feel more comfortable during renting. In some other cases, the solution can give users a look into the vehicle, or guide users to manipulate the vehicle, if they are not familiar with the model.

In step S306, after placing the rental order, the user picks up the vehicle 110 at agreed time and spot. Accordingly, the user terminal 106 generates a second trigger command and send it to the server 102. The second trigger command may be a pick-up command indicating that the user picks up the vehicle. In some other cases, the second trigger command may be a detection signal indicating that the user sits inside the vehicle, which can be generated by the vehicle 110, e.g., a sensor within the vehicle 110, although not shown in FIG. 3.

In step S307, the server 102 receives the second trigger command, and generates a hiding command based on the second trigger command, wherein the hiding command is adapted to cause the vehicle 110 to hide the image capturing component from view of the user inside the vehicle. Then the server 102 sends the hiding command to the vehicle 110.

In step S308, the vehicle 110 receives the hiding command, and hides the image capturing component from view of the user inside the vehicle in response to the hiding command. The image capturing component may be hidden from view in many ways. For example, the image capturing component may be provided with a shielding plate which is movable to cover the image capturing component in response to the hiding command. In other examples, the image capturing component can rotate around at least one of a horizontal axis and a vertical axis, so as to be hidden from view. Please note that, the hiding way is not limited to those as mentioned above, but can be any kind of way as long as the image capturing component can be switched between the exposed state and the hidden state. In this regard, the image capturing component can be only activated and exposed when the vehicle is not in service, so as to ensure that there is no concern of violation of privacy.

In step S309, at the end of the rental, the user returns the vehicle 110. At this time, the user terminal 106 generates a first trigger command, which is a return command indicating the user returns the vehicle, and sends it to the server 102.

In step S310, the server 102 receives the return command, and generates an activation command based on the return command. The activation command is adapted to cause the vehicle 110 to activate an image capturing component arranged inside the vehicle so as to obtain one or more images of the vehicle interior. Then the server 102 sends the activation command to the vehicle 110.

In step S311, the vehicle 110 receives the activation command and accordingly activates the image capturing component so as to obtain one or more images of the vehicle interior. Then, the vehicle 110 transmits the one or more images of the vehicle interior to the server 102. The vehicle 110 may generate only one image for the interior of the vehicle, or may generate more than one images.

In step S312, the server 102 receives the one or more images of the vehicle interior. The server 102 may compare the image(s) generated in step S311 (i.e., before the rental service) with the image(s) generated in step S303 (i.e., after the rental service), so as to evaluate the usage condition for this renting order. For example, the server 102 may evaluate the clean/abrasion/breakage condition for the vehicle, and accordingly calculate cleaning fee or compensation fee to be paid by the user. Then the server 102 may send the usage condition with possible cleaning fee or compensation fee to the user terminal 106.

In step S313, the user terminal 106 receives the usage condition, and in some cases, possibly information about the cleaning fee or compensation fee to be paid.

In such case, this may help the operator managing the cleaning activities for the vehicles more efficiently. For example, reward points can be given to users by the operator if the vehicle is returned in a clean condition. Otherwise, if the vehicle is returned in a dirty condition, the additional cleaning fee would be charged with the captured images as evidence. It also enables the operator to monitor the vehicle condition, detect the dirty in the vehicle and reduce the cleaning fee. Further, the operator may check the vehicle interior easily with the help of the image capturing component.

Figure 4:
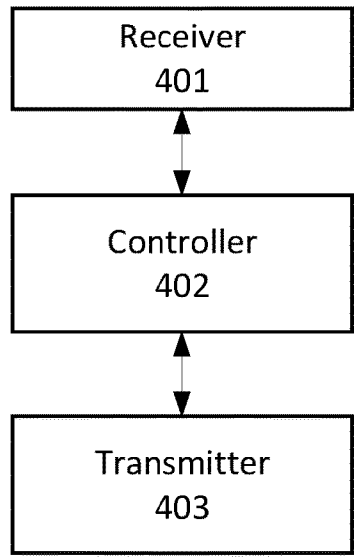
FIG. 4 illustrates an exemplary block diagram of a server for vehicle sharing in accordance with an exemplary embodiment of the present disclosure.

FIG. 4 illustrates an exemplary block diagram of the server 102 for vehicle sharing in accordance with an exemplary embodiment of the present disclosure. The server 102 may comprise a receiver 401, a controller 402, and a transmitter 403.

More specifically, the receiver 401 is configured to receive a first trigger command or a second trigger command in relation with renting of the vehicle.

The controller 402 is configured to generate an activation command based on the first trigger command and generate a hiding command based on the second trigger command, wherein the activation command is adapted to cause the vehicle to activate an image capturing component arranged inside the vehicle so as to obtain one or more images of the vehicle interior, and the hiding command is adapted to cause the vehicle to hide the image capturing component from view of a user inside the vehicle.

The controller 402 may control overall operations of the server 102, and may be a computing device as will be described in details below, a processor, or the like. In some examples, the server 102 may further comprise a storage device (not shown) for storing data, information, commands, computer readable instructions or the like. The storage device may be accessed by the controller 402 or other components.

The transmitter 403 is configured to transmit the activation command or the hiding command to the vehicle.

In addition, the receiver 401 is further configured to receive the one or more images of the vehicle interior from the vehicle.

As discussed above, the first trigger command may be a selection command indicating that the user selects the vehicle, a placing-order command indicating that the user places an order for renting the vehicle, or a return command indicating the user returns the vehicle.

As discussed above, the second trigger command may be a pick-up command indicating that the user picks up the vehicle, or a detection signal indicating that the user sits inside the vehicle.

In some examples, in the case of receiving more than one images of the vehicle interior from the vehicle, the controller is further configured to combine the more than one images into one image showing the entire interior of the vehicle.

In some other examples, in the case that the first trigger command is the selection command indicating that the user selects the vehicle before placing an order for renting the vehicle, the transmitter is further configured to transmit the one or more images of the vehicle interior to the user's terminal, in order for the user to preview the vehicle interior before placing the order.

In some other examples, the controller is further configured to generate a tutorial for guiding the user to manipulate the vehicle, based on the received one or more images of the vehicle interior.

In some other examples, when the user selects the vehicle or places the order for renting the vehicle, the first trigger command is the selection command or the placing-order command, and the receiver receives the one or more images of the vehicle interior as a first set of images. When the user returns the vehicle, the first trigger command is the return command, and the receiver receives the one or more images of the vehicle interior as a second set of images. Moreover, the controller is further configured to compare the second set of images with the first set of images so as to evaluate the usage condition for this renting order.

Figure 5:
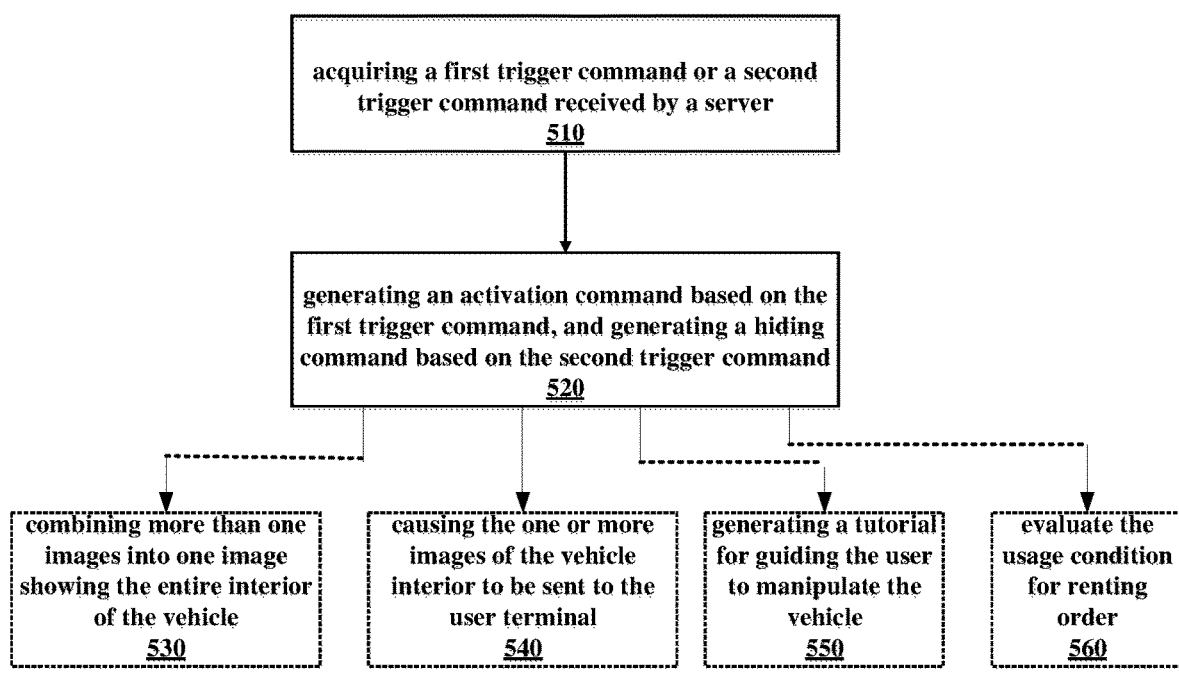
FIG. 5 illustrates a flow chart showing an exemplary process performed by the controller of the server in accordance with an exemplary embodiment of the present disclosure.

FIG. 5 illustrates a flow chart showing an exemplary process performed by the controller 402 of the server in accordance with an exemplary embodiment of the present disclosure. The controller 402 may be the computing device as will be discussed below, and may perform the method for vehicle sharing as shown in FIG. 5.

Specifically, at operation 510, a first trigger command or a second trigger command received by a server is acquired by the controller 402.

At operation 520, an activation command is generated based on the first trigger command, and a hiding command is generated based on the second trigger command. The first and second trigger commands are in relation with renting of the vehicle, the activation command is adapted to cause the vehicle to activate an image capturing component arranged inside the vehicle so as to obtain one or more images of the vehicle interior, and the hiding command is adapted to cause the vehicle to hide the image capturing component from view of a user inside the vehicle.

In some examples, the first trigger command is a selection command indicating that the user selects the vehicle, a placing-order command indicating that the user places an order for renting the vehicle, or a return command indicating the user returns the vehicle.

In some examples, the second trigger command is a pick-up command indicating that the user picks up the vehicle, or a detection signal indicating that the user sits inside the vehicle.

In some other examples, the method may optionally comprises operation 530, 540, 550, or 560.

At operation 530, the more than one images may be combined into one image showing the entire interior of the vehicle, in the case of obtaining more than one images of the vehicle interior.

At operation 540, the one or more images of the vehicle interior may be caused to be sent to the user's terminal, in order for the user to preview the vehicle interior before placing the order, in the case that the first trigger command is the selection command indicating that the user selects the vehicle before placing an order for renting the vehicle.

At operation 550, a tutorial for guiding the user to manipulate the vehicle may be generated, based on the one or more images of the vehicle interior.

At operation 560, the one or more images of the vehicle interior may be stored as a first set of images, when the user selects the vehicle or places the order for renting the vehicle, and the first trigger command is the selection command or the placing-order command. In addition, the one or more images of the vehicle interior may be stored as a second set of images, when the user returns the vehicle, and the first trigger command is the return command. Further, the second set of images may be compared with the first set of images so as to evaluate the usage condition for this renting order.

Figure 6:
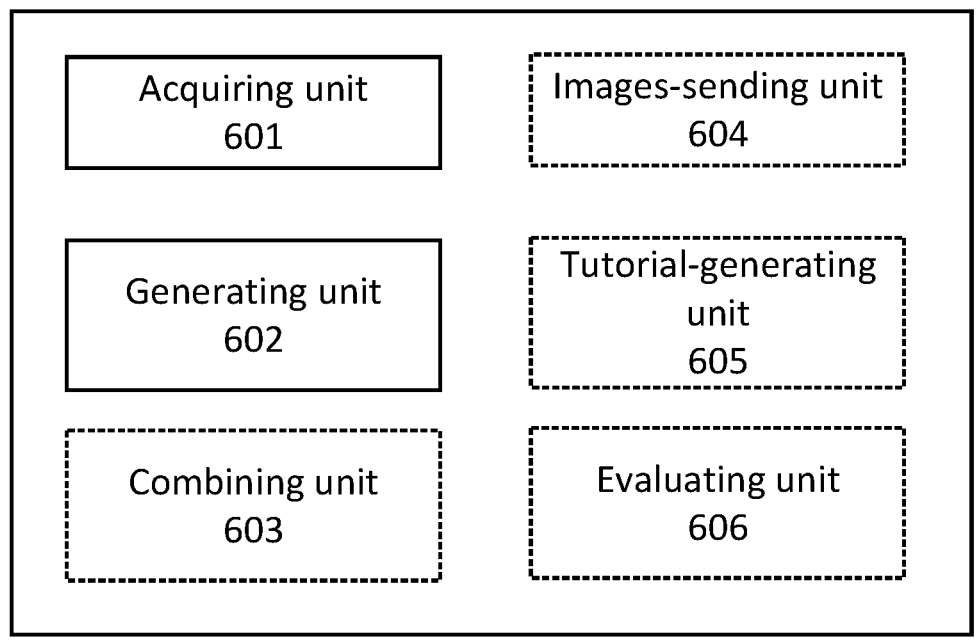
FIG. 6 illustrates an exemplary block diagram of the controller of the server in accordance with an exemplary embodiment of the present disclosure.

FIG. 6 illustrates an exemplary block diagram of the controller 402 of the server 102 in accordance with an exemplary embodiment of the present disclosure. As shown in FIG. 6, the controller 402 comprises: an acquiring unit 601, and a generating unit 602. Optionally, the controller 402 may also comprise: a combining unit 603, an images-sending unit 604, a tutorial-generating unit 605, or an evaluating unit 606.

More specifically, the acquiring unit 601 is configured to acquire a first trigger command or a second trigger command received by a server.

The generating unit 602 is configured to generate an activation command based on the first trigger command, and generate a hiding command based on the second trigger command. The first and second trigger commands are in relation with renting of the vehicle. The activation command is adapted to cause the vehicle to activate an image capturing component arranged inside the vehicle so as to obtain one or more images of the vehicle interior. The hiding command is adapted to cause the vehicle to hide the image capturing component from view of a user inside the vehicle.

The combining unit 603 is optional, and is configured to combine the more than one images into one image showing the entire interior of the vehicle, in the case of obtaining more than one images of the vehicle interior.

The images-sending unit 604 is optional, and is configured to cause the one or more images of the vehicle interior to be sent to the user's terminal, in order for the user to preview the vehicle interior before placing the order, in the case that the first trigger command is the selection command indicating that the user selects the vehicle before placing an order for renting the vehicle.

The tutorial-generating unit 605 is optional, and is configured to generate a tutorial for guiding the user to manipulate the vehicle, based on the one or more images of the vehicle interior.

The evaluating unit 606 is optional, and is configured to store the one or more images of the vehicle interior as a first set of images, when the user selects the vehicle or places the order for renting the vehicle, and the first trigger command is the selection command or the placing-order command. The evaluating unit 606 is further configured to store the one or more images of the vehicle interior as a second set of images, when the user returns the vehicle, and the first trigger command is the return command. Moreover, the evaluating unit 606 is further configured to compare the second set of images with the first set of images so as to evaluate the usage condition for this renting order.

Please note that, the respective units 601-606 in the controller 402 can be configured to perform the corresponding operations 510-560 as discussed above in the method of FIG. 5, and thus their details are omitted here.

Figure 7:
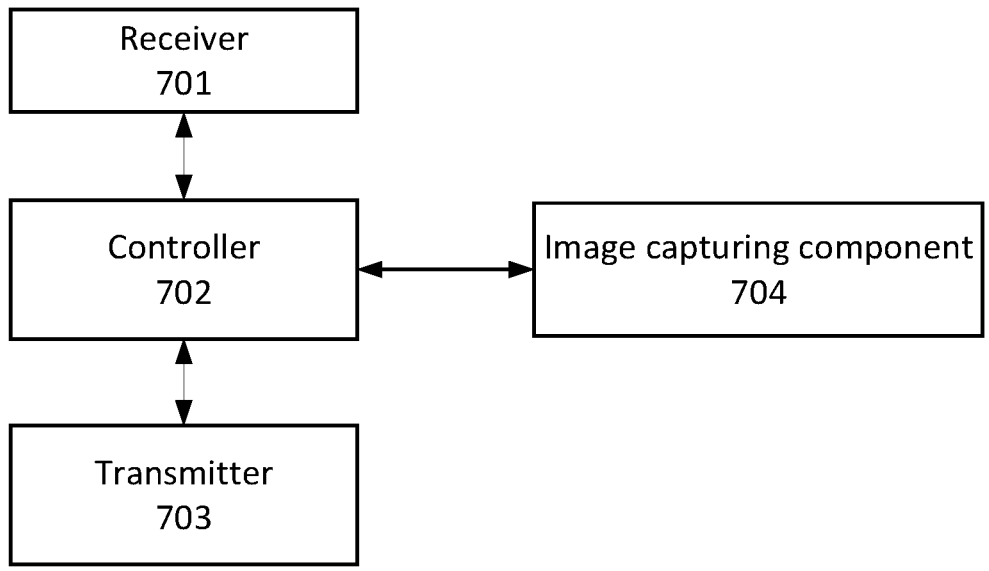
FIG. 7 illustrates an exemplary block diagram of an on-vehicle apparatus for vehicle sharing in accordance with an exemplary embodiment of the present disclosure.

FIG. 7 illustrates an exemplary block diagram of an on-vehicle apparatus for vehicle sharing in accordance with an exemplary embodiment of the present disclosure. The on-vehicle apparatus 700 is included in the vehicle 110, and comprises a receiver 701, a controller 702, a transmitter 703 and an image capturing component 704. The vehicle may further comprise one or more sensors (not shown) and a head unit (not shown). The one or more sensors may be mounted to or coupled to a plurality of components within the vehicle, to detect whether there is anybody inside the vehicle in some cases. In the case of detecting anybody within the vehicle, the vehicle may generate a detection signal as the second trigger command and send it to the server. Or the vehicle may automatically hide the image capturing component from view in response to the detection signal. Additionally or alternatively, the sensors may detect other information of the vehicle which is concerned by the user, before or during the vehicle is in service. The head unit may be a storage device mounted within the vehicle such as a memory of a random type which is used to save data or image with respect to the vehicle.

The receiver 701 may be configured to receive an activation command or a hiding command.

The controller 702 may be configured to activate the image capturing component 704 so as to obtain one or more images of the vehicle interior in response to the activation command, and to hide the image capturing component 704 from view of the user inside the vehicle in response to the hiding command.

The transmitter 703 may be configured to transmit the one or more images of the vehicle interior to the server.

In some examples, when the user places an order for renting the vehicle, or selects the vehicle before or after placing the order, the receiver 701 receives the activation command so that the image capturing component captures one or more images of the vehicle interior; and when the user picks up the vehicle or it is detected that the user sits inside the vehicle, the receiver receives the hiding command so that the image capturing component is hidden from view of the user inside the vehicle.

In some examples, preferably, the image capturing component 704 may be arranged at the middle top of the vehicle, and have at least 90° field of view. Additionally or alternatively, the image capturing component may be able to rotate around at least one of a horizontal axis and a vertical axis. More details of preferred examples of the image capturing component will be described with respect to FIGS. 10A-10B, 11A-11C, 12A-12C and 13A-13D below.

FIGS. 10A-10B show a preferred position of the image capturing component 11 (such as camera etc.) inside the vehicle 110, wherein FIG. 10A illustrates a side view of the vehicle 110 containing the image capturing component 11 and four seats 12, and FIG. 10B illustrates a top view of the vehicle 110 containing the image capturing component 11 and four seats 12, in accordance with an exemplary embodiment of the present disclosure.

As can be seen from FIGS. 10A-10B, the camera 11 is preferably arranged at the middle top of the vehicle 110. With such preferred arrangement, the camera 11 can readily get a 360-degree view for the entire interior of the vehicle 110. In some examples, the camera 11 may rotate around the vertical axis so as to obtain the 360-degree view image of the vehicle interior, as shown in FIGS. 11A-11C.

FIGS. 11A-11C illustratively shows three front views of different states of the image capturing component 11 while it rotates around the vertical axis, in accordance with an exemplary embodiment of the present disclosure. The image capturing component 11 comprises a lens 13. With the image capturing component 11 making a round, the 360-degree view image of the vehicle interior can be captured.

Preferably, the image capturing component 11 has at least 90° field of view, so that four images captured by it via four directions can reach 360° view, as shown in FIGS. 13A-13D. FIGS. 13A-13D illustratively shows four top views of the vehicle 110 containing the image capturing component 11, while the image capturing component 11 rotates around the vertical axis for 360° view of the vehicle interior, in accordance with an exemplary embodiment of the present disclosure. The shaded portion 14 in FIGS. 13A-13D schematically show the viewing field of the image capturing component 11 when its lens 13 faces four different directions respectively. The image capturing component 11 may capture four images from four different directions respectively and the captured four images may cover the entire interior of the vehicle 110. Preferably, the image capturing component 11 may have at least 120° field of view. More preferably, the image capturing component 11 may have 156° field of view.

In another preferred example, for the purpose of readily hiding the image capturing component 11 from view, the lens of the image capturing component 11 may rotate around the horizontal axis, as shown in FIGS. 12A-12C. FIGS. 12A-12C illustratively shows three front views of different states of the image capturing component 11 while its lens 13 rotates around the horizontal axis, in accordance with an exemplary embodiment of the present disclosure. As can be seen from FIG. 12C, when the lens 13 rotates so as to face up, the lens 13 is shielded and hidden from view of the user. Certainly, at this time, the image capturing component 11 cannot work, and thus it can be ensured that there is no concern of violation of privacy.

It will be apparent that, the above examples of the image capturing component 11 as shown in FIGS. 10A-10B, 11A-11C, 12A-12C and 13A-13D are merely exemplary, and not intended to limit the scope of the present invention.

Figure 8:
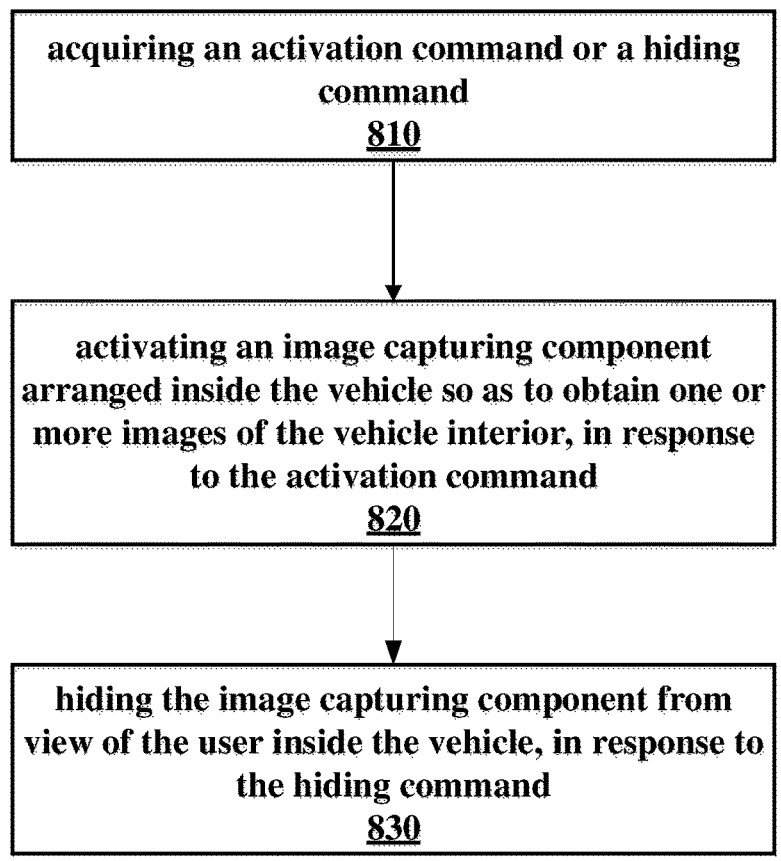
FIG. 8 illustrates a flow chart showing an exemplary process performed by the controller of the on-vehicle apparatus in accordance with an exemplary embodiment of the present disclosure.

FIG. 8 illustrates a flow chart showing a process performed by the controller 702 of the on-vehicle apparatus in accordance with an exemplary embodiment of the present disclosure.

Specifically, at operation 810, an activation command or a hiding command may be acquired.

At operation 820, an image capturing component arranged inside the vehicle may be activated so as to obtain one or more images of the vehicle interior, in response to the activation command, and the image capturing component may be hidden from view of the user inside the vehicle, in response to the hiding command.

In some examples, when the user places an order for renting the vehicle, or selects the vehicle before or after placing the order, the activation command is acquired, so that the image capturing component is activated so as to obtain the one or more images of the vehicle interior. In addition, when the user picks up the vehicle or it is detected that the user sits inside the vehicle, the hiding command is acquired, so that the image capturing component is hidden from view of the user inside the vehicle.

Figure 9:
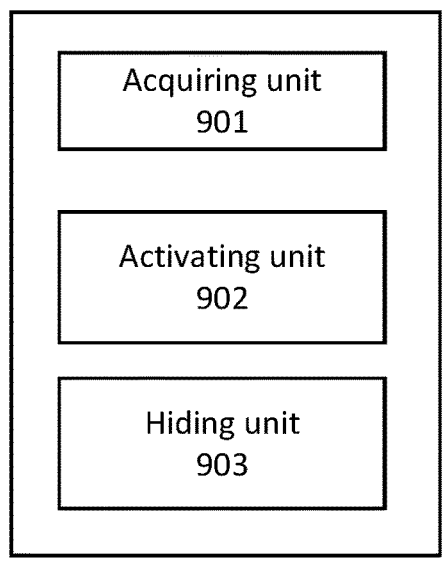
FIG. 9 illustrates an exemplary block diagram of the controller of the on-vehicle apparatus in accordance with an exemplary embodiment of the present disclosure.

FIG. 9 illustrates an exemplary block diagram of the controller 702 of the on-vehicle apparatus in accordance with an exemplary embodiment of the present disclosure. As shown in FIG. 9, the controller 702 comprises: an acquiring unit 901, an activating unit 902, and a hiding unit 903.

More specifically, the acquiring unit 901 is configured to acquire an activation command or a hiding command.

The activating unit 902 is configured to activate an image capturing component arranged inside the vehicle so as to obtain one or more images of the vehicle interior, in response to the activation command.

The hiding unit 903 is configured to hide the image capturing component from view of a user inside the vehicle, in response to the hiding command.

Please note that, the respective units 901-903 in the controller 702 can be configured to perform the corresponding operations 810-830 as discussed above in the method of FIG. 8, and thus their details are omitted here.

Moreover, the present invention may provide another apparatus for vehicle sharing, comprising: one or more processors; and one or more memories configured to store a series of computer executable instructions. The series of computer executable instructions, when executed by the one or more processors, cause the one or more processors to perform some or all of the steps of the methods as discussed above.

Furthermore, the present invention may provide a non-transitory computer readable storage medium having instructions stored thereon that, when executed by one or more processors, cause the one or more processors to perform some or all of the steps of the methods as discussed above.

Figure 14:
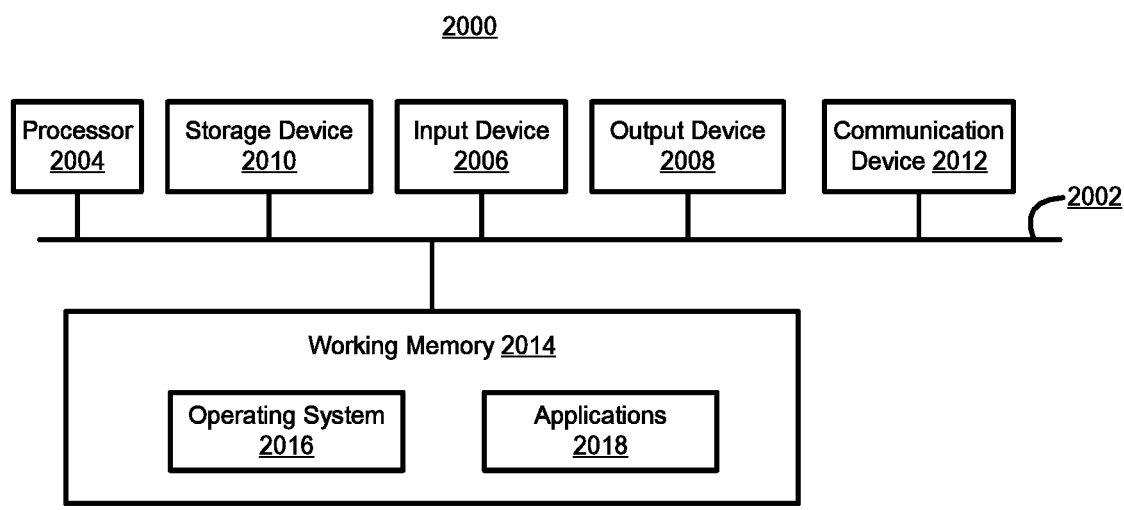
FIG. 14 illustrates a general computing device wherein the present disclosure is applicable in accordance with an exemplary embodiment of the present disclosure.

FIG. 14 illustrates a general computing device 2000 wherein the present disclosure is applicable in accordance with an exemplary embodiment of the present disclosure.

With reference to FIG. 14, a computing device 2000, which is an example of the hardware device that may be applied to the aspects of the present disclosure, will now be described. The computing device 2000 may be any machine configured to perform processing and/or calculations, may be but is not limited to a work station, a server, a desktop computer, a laptop computer, a tablet computer, a personal data assistant, a smart phone, an on-vehicle computer or any combination thereof. The aforementioned controller 402, 702, the server 102, or the apparatus 700 for vehicle sharing may be wholly or at least partially implemented by the computing device 2000 or a similar device or system.

The computing device 2000 may comprise elements that are connected with or in communication with a bus 2002, possibly via one or more interfaces. For example, the computing device 2000 may comprise the bus 2002, one or more processors 2004, one or more input devices 2006 and one or more output devices 2008. The one or more processors 2004 may be any kinds of processors, and may comprise but are not limited to one or more general-purpose processors and/or one or more special-purpose processors (such as special processing chips). The input devices 2006 may be any kinds of devices that can input information to the computing device, and may comprise but are not limited to a mouse, a keyboard, a touch screen, a microphone and/or a remote control. The output devices 2008 may be any kinds of devices that can present information, and may comprise but are not limited to display, a speaker, a video/audio output terminal, a vibrator and/or a printer. The computing device 2000 may also comprise or be connected with non-transitory storage devices 2010 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 2010 may be detachable from an interface. The non-transitory storage devices 2010 may have data/instructions/code for implementing the methods and steps which are described above. The computing device 2000 may also comprise a communication device 2012. The communication device 2012 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like. The transmitter/receiver/communication device as aforementioned may, for example, be implemented by the communication device 2012.

When the computing device 2000 is used as an on-vehicle device, it may also be connected to external device, for example, a GPS receiver, sensors for sensing different environmental data such as an acceleration sensor, a wheel speed sensor, a gyroscope and so on. In this way, the computing device 2000 may, for example, receive location data and sensor data indicating the travelling situation of the vehicle. When the computing device 2000 is used as an on-vehicle device, it may also be connected to other facilities (such as an engine system, a wiper, an anti-lock Braking System or the like) for controlling the traveling and operation of the vehicle.

In addition, the non-transitory storage device 2010 may have map information and software elements so that the processor 2004 may perform route guidance processing. In addition, the output device 2006 may comprise a display for displaying the map, the location mark of the vehicle, images indicating the travelling situation of the vehicle and also the visual signals. The output device 2006 may also comprise a speaker for audio output.

The bus 2002 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 2002 may also include a Controller Area Network (CAN) bus or other architectures designed for application on an automobile.

The computing device 2000 may also comprise a working memory 2014, which may be any kind of working memory that may store instructions and/or data useful for the working of the processor 2004, and may comprise but is not limited to a random access memory and/or a read-only memory device.

Software elements may be located in the working memory 2014, including but are not limited to an operating system 2016, one or more application programs 2018, drivers and/or other data and codes. Instructions for performing the methods and steps described in the above may be comprised in the one or more application programs 2018, and the units of the aforementioned controller 402, 702, the server 102, or the apparatus 700 for vehicle sharing may be implemented by the processor 2004 reading and executing the instructions of the one or more application programs 2018. More specifically, the aforementioned controller 402, 702, the server 102, or the apparatus 700 may, for example, be implemented by the processor 2004 when executing an application 2018 having instructions to perform the steps of the above-mentioned methods. In addition, the generating unit 602 of the aforementioned controller 402 may, for example, be implemented by the processor 2004 when executing an application 2018 having instructions to perform the step S20 of the method of FIG. 5. Other units of the aforementioned controller 402 may also, for example, be implemented by the processor 2004 when executing an application 2018 having instructions to perform one or more of the aforementioned respective steps. The executable codes or source codes of the instructions of the software elements may be stored in a non-transitory computer-readable storage medium, such as the storage device(s) 2010 described above, and may be read into the working memory 2014 possibly with compilation and/or installation. The executable codes or source codes of the instructions of the software elements may also be downloaded from a remote location.

The above described order of the steps for the method is only intended to be illustrative, and the steps of the method of the present invention are not limited to the above specifically described order unless otherwise specifically stated. Those skilled in the art may clearly know from the above embodiments that the above mentioned units or apparatuses of the present disclosure may be implemented by software with necessary hardware, or by hardware, firmware and the like. The units can be combined or split according to the actual applications. Based on such understanding, the embodiments of the present disclosure may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present disclosure.

Although some specific embodiments of the present invention have been demonstrated in detail with examples, it should be understood by a person skilled in the art that the above examples are only intended to be illustrative but not to limit the scope of the present invention. Various combinations of the aspects/embodiments in the specification shall be contained in the protection scope of the present invention. It should be understood by a person skilled in the art that the above embodiments can be modified without departing from the scope and spirit of the present invention. The scope of the present invention is defined by the attached claims.

What is claimed is:

1. A server for vehicle sharing, comprising:
   a receiver configured to receive a first trigger command or a second trigger command in relation with renting of a vehicle;
   a controller configured to generate an activation command based on the first trigger command and generate a hiding command based on the second trigger command, wherein
   (i) the activation command is adapted to cause the vehicle to activate an image capturing component arranged inside the vehicle so as to obtain one or more images of the vehicle interior,
   (ii) the hiding command is adapted to cause the vehicle to hide the image capturing component from view of a user inside the vehicle,
   (iii) the first trigger command is: (i) a selection command indicating that the user selects the vehicle, (ii) a placing-order command indicating that the user places an order for renting the vehicle, or (iii) a return command indicating the user returns the vehicle, and
   (iv) the second trigger command is: (i) a pick-up command indicating that the user picks up the vehicle, or (ii) a detection signal indicating that the user sits inside the vehicle; and
   a transmitter configured to transmit the activation command or the hiding command to the vehicle, wherein the receiver is further configured to receive the one or more images of the vehicle interior from the vehicle.

2. The server according to claim 1, wherein, in the case of receiving more than one image of the vehicle interior from the vehicle, the controller is further configured to: combine the more than one images into one image showing the entire interior of the vehicle.

3. The server according to claim 1, wherein, in the case that the first trigger command is the selection command indicating that the user selects the vehicle before placing an order for renting the vehicle, the transmitter is further configured to:
   transmit the one or more images of the vehicle interior to the user's terminal, in order for the user to preview the vehicle interior before placing the order.

4. The server according to claim 1, wherein the controller is further configured to:
   generate a tutorial for guiding the user to manipulate the vehicle, based on the received one or more images of the vehicle interior.

5. The server according to claim 1, wherein
   when the user selects the vehicle or places the order for renting the vehicle, the first trigger command is the selection command or the placing-order command, and the receiver receives the one or more images of the vehicle interior as a first set of images, and
   when the user returns the vehicle, the first trigger command is the return command, and the receiver receives the one or more images of the vehicle interior as a second set of images,
   wherein the controller is further configured to compare the second set of images with the first set of images so as to evaluate the usage condition for the renting order.

6. An on-vehicle apparatus for vehicle sharing, comprising:
   an image capturing component;
   a receiver configured to receive an activation command or a hiding command from a server;
   a controller configured to activate the image capturing component so as to obtain one or more images of the vehicle interior in response to the activation command, and to hide the image capturing component from view of a user inside the vehicle in response to the hiding command; and
   a transmitter configured to transmit the one or more images of the vehicle interior to the server, wherein
   when the user causes a pick-up command by picking up the vehicle or it is detected via a detection signal that the user sits inside the vehicle, the receiver receives the hiding command so that the image capturing component is hidden from view of the user inside the vehicle.

7. The apparatus according to claim 6, wherein the image capturing component is arranged at a middle top of the vehicle, and the image capturing component has at least 90° field of view.

8. The apparatus according to claim 6, wherein the image capturing component is able to rotate around at least one of a horizontal axis and a vertical axis.

9. The apparatus according to claim 6, wherein when the user places an order for renting the vehicle, or selects the vehicle before or after placing the order, the receiver receives the activation command so that the image capturing component captures one or more images of the vehicle interior.

10. A computer-implemented method for vehicle sharing, comprising:
    acquiring a first trigger command or a second trigger command received by a server; and
    generating an activation command based on the first trigger command, and generating a hiding command based on the second trigger command, wherein
    the first and second trigger commands are in relation with renting of the vehicle, the activation command is adapted to cause the vehicle to activate an image capturing component arranged inside the vehicle so as to obtain one or more images of the vehicle interior, the hiding command is adapted to cause the vehicle to hide the image capturing component from view of a user inside the vehicle, the first trigger command is: (i) a selection command indicating that the user selects the vehicle, (ii) a placing-order command indicating that the user places an order for renting the vehicle, or (iii) a return command indicating the user returns the vehicle, and the second trigger command is: (i) a pick-up command indicating that the user picks up the vehicle, or (ii) a detection signal indicating that the user sits inside the vehicle.

11. The method according to claim 10, further comprising:
combining the more than one image into one image showing the entire interior of the vehicle, in the case of obtaining more than one image of the vehicle interior.

12. The method according to claim 10, further comprising:
causing the one or more images of the vehicle interior to be sent to the user's terminal, in order for the user to preview the vehicle interior before placing the order, in the case that the first trigger command is the selection command indicating that the user selects the vehicle before placing an order for renting the vehicle.

13. The method according to claim 10, further comprising:
generating a tutorial for guiding the user to manipulate the vehicle, based on the one or more images of the vehicle interior.

14. The method according to claim 10, further comprising:
storing the one or more images of the vehicle interior as a first set of images, when the user selects the vehicle or places the order for renting the vehicle, and the first trigger command is the selection command or the placing-order command;
storing the one or more images of the vehicle interior as a second set of images, when the user returns the vehicle, and the first trigger command is the return command; and
comparing the second set of images with the first set of images so as to evaluate the usage condition for this renting order.

15. A computer-implemented method for vehicle sharing, comprising:
acquiring an activation command or a hiding command;
activating an image capturing component arranged inside the vehicle so as to obtain one or more images of the vehicle interior, in response to the activation command; and
hiding the image capturing component from view of a user inside the vehicle, in response to the hiding command, wherein
when the user causes a pick-up command by picking up the vehicle or it is detected via a detection signal that the user sits inside the vehicle, the hiding command is acquired, so that the image capturing component is hidden from view of the user inside the vehicle.

16. The method according to claim 15, wherein
when the user places an order for renting the vehicle, or selects the vehicle before or after placing the order, the activation command is acquired, so that the image capturing component is activated so as to obtain the one or more images of the vehicle interior.

17. An apparatus for vehicle sharing, comprising:
one or more processors; and
one or more memories configured to store a series of computer executable instructions, wherein
the series of computer executable instructions, when executed by the one or more processors, cause the one or more processors to:
receive a first trigger command or a second trigger command in relation with renting of a vehicle;
generate an activation command based on the first trigger command and generate a hiding command based on the second trigger command, wherein
the activation command is adapted to cause the vehicle to activate an image capturing component arranged inside the vehicle so as to obtain one or more images of the vehicle interior,
the hiding command is adapted to cause the vehicle to hide the image capturing component from view of a user inside the vehicle,
the first trigger command is: (i) a selection command indicating that the user selects the vehicle, (ii) a placing-order command indicating that the user places an order for renting the vehicle, or (iii) a return command indicating the user returns the vehicle, and
the second trigger command is: (i) a pick-up command indicating that the user picks up the vehicle, or (ii) a detection signal indicating that the user sits inside the vehicle; and
transmit the activation command or the hiding command to the vehicle; and
receive the one or more images of the vehicle interior from the vehicle.

18. A non-transitory computer readable storage medium having instructions stored thereon that, when executed by one or more processors, cause the one or more processors to:
receive a first trigger command or a second trigger command in relation with renting of a vehicle;
generate an activation command based on the first trigger command and generate a hiding command based on the second trigger command, wherein
the activation command is adapted to cause the vehicle to activate an image capturing component arranged inside the vehicle so as to obtain one or more images of the vehicle interior,
the hiding command is adapted to cause the vehicle to hide the image capturing component from view of a user inside the vehicle,
the first trigger command is: (i) a selection command indicating that the user selects the vehicle, (ii) a placing-order command indicating that the user places an order for renting the vehicle, or (iii) a return command indicating the user returns the vehicle, and
the second trigger command is: (i) a pick-up command indicating that the user picks up the vehicle, or (ii) a detection signal indicating that the user sits inside the vehicle; and
transmit the activation command or the hiding command to the vehicle; and
receive the one or more images of the vehicle interior from the vehicle.

* * * * *